(12) United States Patent
Lee et al.

(10) Patent No.: US 10,587,675 B2
(45) Date of Patent: Mar. 10, 2020

(54) OFFLINE MOBILE DATA STORAGE SYSTEM AND METHOD

(71) Applicant: InterPro Solutions, LLC, Stoneham, MA (US)

(72) Inventors: Jack Lee, Weston, MA (US); Eric James O'Connell, Newton, MA (US)

(73) Assignee: InterPro Solutions, LLC, Stoneham, MA (US)

( * ) Notice: Subject to any disclaimer, the term of this patent is extended or adjusted under 35 U.S.C. 154(b) by 104 days.

(21) Appl. No.: 15/893,287

(22) Filed: Feb. 9, 2018

(65) Prior Publication Data
US 2019/0253476 A1    Aug. 15, 2019

(51) Int. Cl.
| | |
|---|---|
| H04L 29/08 | (2006.01) |
| G06F 21/60 | (2013.01) |
| G06F 16/21 | (2019.01) |
| G06F 16/25 | (2019.01) |
| G06F 16/901 | (2019.01) |
| G06F 21/62 | (2013.01) |
| H04L 29/06 | (2006.01) |

(52) U.S. Cl.
CPC .......... *H04L 67/06* (2013.01); *G06F 16/213* (2019.01); *G06F 16/258* (2019.01); *G06F 16/9017* (2019.01); *G06F 21/602* (2013.01); *G06F 21/6227* (2013.01); *H04L 67/1002* (2013.01); *H04L 67/2842* (2013.01); *H04L 67/42* (2013.01)

(58) Field of Classification Search
CPC ... H04L 41/024; H04L 67/06; H04L 67/1002; H04L 67/2842; H04L 67/42; G06F 2206/1012; G06F 16/258; G06F 16/9017; G06F 16/213; G06F 21/602; G06F 21/6227
See application file for complete search history.

(56) References Cited

U.S. PATENT DOCUMENTS 9,851,953 B2 * 12/2017 Straub .................. G06F 8/34

* cited by examiner

*Primary Examiner* — Azizul Choudhury
(74) *Attorney, Agent, or Firm* — McInnes & McLane, LLP; Jodi-Ann McLane

(57) ABSTRACT

A system and method is provided for the quick and efficient transfer of large amounts of data to mobile devices from enterprise asset management software residing on a primary server, via an intermediary server in a seamless and streamlined fashion, making the downloaded data available accessible by users of the mobile devices ahead of time, anywhere and at any time in an offline (disconnected) or online (Internet connected) mode.

9 Claims, 9 Drawing Sheets

OFFLINE MOBILE DATA STORAGE SYSTEM AND METHOD

TECHNICAL FIELD

This invention generally relates to wireless data communications, and more particularly relates to the quick and efficient transfer of large amounts of data between mobile devices and servers over wireless data networks that overcome byte size and server and mobile device constraints.

BACKGROUND

In the majority of today's work places, mobile devices have become standard for employees to retrieve job assignments, review job schedules, document work performed, and respond to customer feedback. With the increased usage of mobile devices, the consumption of necessary data to perform various job functions also increases. In many ways, employees who utilize mobile technologies demand data to be accessible from anywhere and at any time. The speed of data retrieval becomes very important in an employees' mobile technology adoption rate. From a corporation's perspective, a higher employee adoption rate means a higher return on investment on a corporation's mobile strategies.

Presently, Enterprise asset management (EAM) software provides companies with a way to access, share, and manage the physical assets of an organization on a common platform. EAM is utilized to operate and maintain assets in a variety of industries, for example, airlines/airports, oil/gas companies, higher education (i.e., facilities), government, and hospitals, to name a few. Generally, EAM software can be utilized with any organization that has physical assets to maintain, and can be utilized to manage all types of assets—including plant, production, infrastructure, facilities, transportation and communications, among others.

One popular EAM software utilized across a variety of industries is IBM's Maximo® asset management software, which allows for managing physical assets on a common platform in asset-intensive industries and offers "built in" mobile access. The Maximo® asset management software is a popular choice, having a majority of the market share for EAM software. While the Maximo® software can be accessed on mobile devices by users in the field, accessing data in this manner requires an Internet connection in order to get the data on a real-time basis. However, mobile connectivity is not always available and can be dropped at any time due to a variety of reasons, including, for example, inaccessibility in a particular area. At the present time, the prior art lacks reliable systems that allow employees who utilize mobile technologies to demand data to be accessible from anywhere at any time. For those users who are out in the field, in certain remote or other areas, a user may be without coverage for days, and unable to take advantage of their mobile device on-line to transfer information and data in real-time.

The traditional method of downloading data onto the user's mobile device entails the device making requests to the particular server through standard web http protocol. Using the http request method, the data is transferred between the mobile device and the server in byte streams. Depending on the mobile device chosen, i.e., iOS, Android, or Windows, the limit of each byte stream for each request is different across the various mobile platforms. Each request and response between the mobile device and the server must be small enough to ensure a complete and uninterrupted data set. Due to this limitation, with a potential large user data set, there are often many round trips from the device to the server, hence, a substantial amount of time to download a users' requested data using this traditional method is often required. This is widely known in the art as the classic data bottleneck problem associated with making conventional client data requests to an enterprise server. Conventionally, a client operating a mobile device makes a data request to an enterprise server via an intermediary server. The data request may be classified as a round robin request which is initiated by a client request sent to the intermediary server. Upon receiving the request, the intermediary server relays the client (HTTP) request to the enterprise server, constituting an uplink portion of the round robin request. Thereafter, during the downlink process, the requested data is retrieved by the enterprise server and transmitted back to the intermediary server which in turn relays the data back to the mobile device. Notably, the classic data bottleneck problem occurs during the downlink process given the enormous number of requests that may be received at the enterprise server over time. The data bottleneck overwhelms the enterprise server restricting its capacity for satisfying an enormous request volume. The present invention overcome the classic data bottleneck problem, first by establishing a unique method of processing the data received at the intermediary server from the enterprise server and secondly, by establishing a series of dynamically adjustable wait queues at the intermediary server to service the client requests in a timely and efficient manner.

In addition to limitations on the request and response by byte size, server and user device constraints also play a factor for download speeds. Each company chooses how to allocate their server resources, and within an enterprise application-hosting environment, server resources are often limited due to internal reasons such as a company's budget and funding, resource allocation, and sharing across various applications. This is in contrast to consumer applications, where setting up server farms to handle mass amount of traffic is the norm. Generally, the server resources allocated for an enterprise application do not have the same type of capacity. Likewise, in an enterprise setting, companies themselves decide on the types of mobile devices they wish to use and standardize, with many corporations moving to the BYOD (bring your own device) strategy. To accommodate the various device specifications, an enterprise mobile software application not only needs to run on various types of devices, but also needs to accommodate the performance of the different devices both online in real-time and when downloading data for later off-line usage.

SUMMARY

In view of the foregoing it can be seen that there is a need for a system and method that can enable users to quickly and efficiently access data on their mobile devices that overcome the limitations of byte size, server constraints and user device constraints.

According to some possible embodiments, a system and method provides for the quick and efficient transfer of large amounts of data to mobile devices from enterprise asset management software residing on a primary server, via an intermediary server in a seamless and streamlined fashion, making the downloaded data available accessible by a user of the mobile device ahead of time, anywhere and at any time in an offline (disconnected) or online (Internet connected) mode.

In a preferred embodiment, the system and method provides for the streamlined and seamless downloading of large amounts of data from a primary server, which is preferably an EAM management software server running EAM management software, such as for example Maximo® software, via a dedicated intermediary server, to mobile devices. To improve the efficiency associated with the downloading of large amounts of data under the constraints of byte size and server and user device storage constraints, it is necessary to improve both data download speeds (i.e. download the data faster), and take into account the storage limitations of present day mobile devices (i.e. shrink the data size). The present invention accomplishes both goals of downloading the data faster and taking up less space on the mobile device, by offloading the processing requirements of the mobile device to the intermediary server. In this manner, the data to be downloaded to the mobile devices is parsed by an external intermediary dedicated server, instead of being parsed on the mobile device itself as is traditional. In this manner, parsing the data at the external intermediary dedicated server rather than at the mobile device has the advantage of streamlining the transfer of data between the mobile device and the primary server given the enhanced processing capabilities of the intermediary server as compared with the limited processing capabilities of the mobile device.

Still another aspect of the invention pertains to preventing the dedicated intermediary server from crashing due to an excessive amount of traffic coming into the dedicated intermediary server. In one embodiment, the server traffic is managed so that a limited number of users can access the data at the same time. Crash prevention is accomplished by having the dedicated server communicate with one or more external customer systems to retrieve the necessary data requested by users of the mobile devices, then parse the retrieved data for eventual download to the user's mobile device.

In accordance with a further aspect, in order to translate and transfer data from external customer systems, via a dedicated intermediary server to a mobile device in a seamless and streamlined manner, a database schema is configured at the dedicated intermediary server. The database schema configuration (DBSC) details all aspects of the database that will be transferred upon completion, including but not limited to, all tables, indexes and data retrieval actions that define the communication between the external systems (i.e. the customer server housing the EAM software) and the dedicated intermediary server to request and retrieve information. It also defines how the data is organized, how the relations among the data are associated, and formulates the constraints that are to be applied on the data.

The present invention provides any Apple, Android, Blackberry or Windows device with the ability to interact with IBM's Maximo application system in both real-time (connected) as well as offline (disconnected) modes. In addition, it seamlessly transitions from real-time to offline mode when a user's connection to the EAM software is lost.

BRIEF DESCRIPTION OF THE DRAWINGS

Various aspects of at least one embodiment are discussed below with reference to the accompanying figures, which are not necessarily drawn to scale, emphasis instead being placed upon illustrating the principles disclosed herein. The figures are included to provide an illustration and a further understanding of the various aspects and embodiments, and are incorporated in and constitute a part of this specification, but are not intended as a definition of the limits of any particular embodiment. The figures, together with the remainder of the specification, serve only to explain principles and operations of the described and claimed aspects and embodiments, but are not to be construed as limiting embodiments. In the figures, each identical or nearly identical component that is illustrated in various figures is represented by a like numeral. For purposes of clarity, not every component may be labeled in every figure.

DETAILED DESCRIPTION OF THE ILLUSTRATIVE EMBODIMENTS

Figure 1:
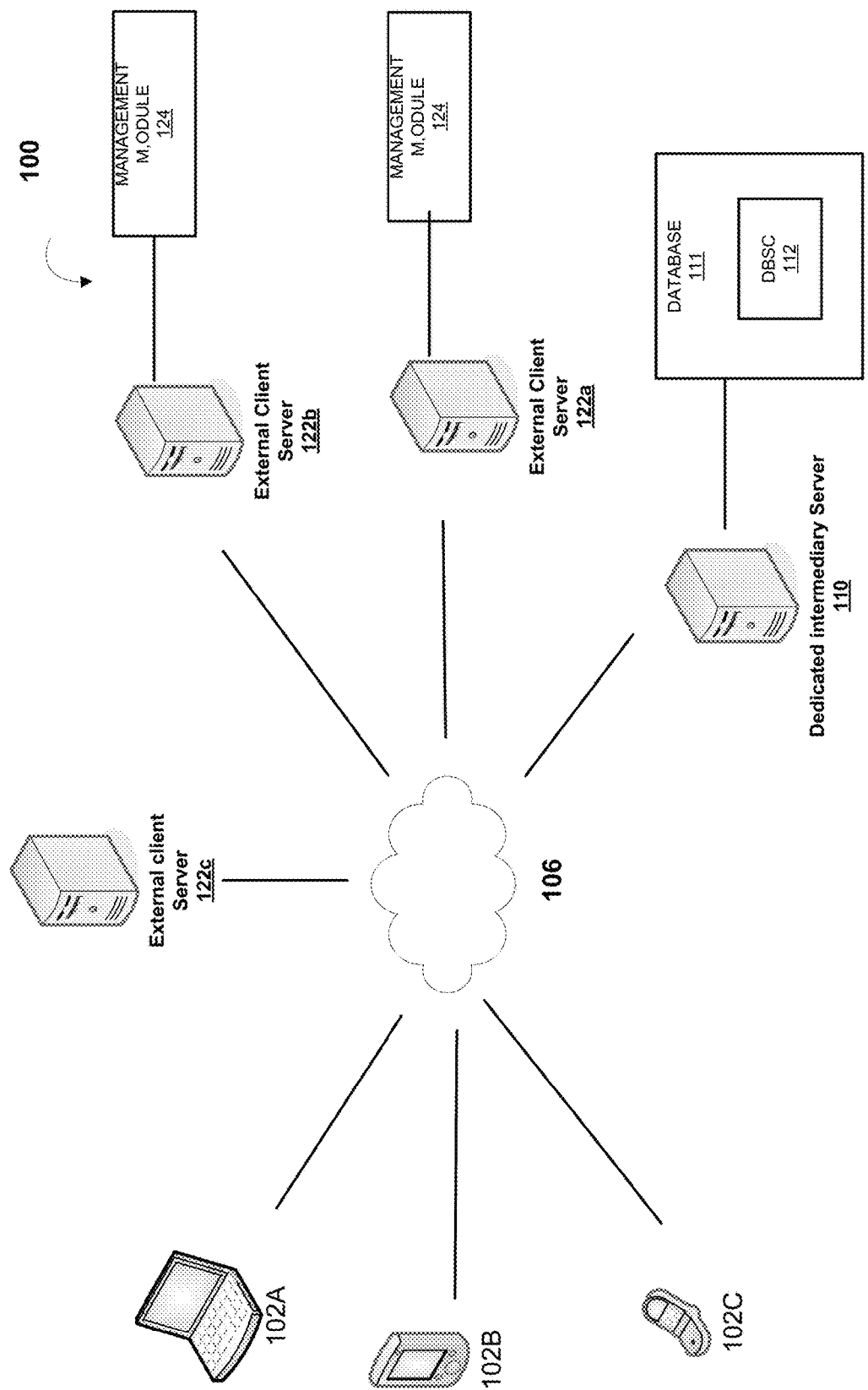
FIG. 1 is a system diagram depicting an architectural overview of a networked system for facilitating the seamless and streamlined transfer of translated data from an external system.

The examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples or embodiments are not intended to be excluded from a similar role in any other examples or embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

The terminology used in the description presented below is intended to be interpreted in its broadest reasonable manner, even though it is being used in conjunction with a detailed description of specific embodiments of the invention. Some terms may even be emphasized below. However, any terminology intended to be interpreted in any restricted manner will be overtly and specifically defined as such in this Detailed Description section.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

Operational Overview

The present invention, in a preferred embodiment, generally operates in two stages, i.e., (a.) a pre-configuration stage and (b.) an operational stage, broadly described as follows:

Pre-Configuration Stage

In the pre-configuration stage, a plurality of clients each configure a general purpose database schema configuration (DBSC) template to create a corresponding plurality of unique client specific (DBSC) configuration files, according to each client's special data requirements.

With reference to FIGS. 1 and 2, a client specific (DBSC) configuration file 200 details all aspects of the client specific database that will be transferred upon completion to each client, including but not limited to, all tables, indexes and data retrieval actions that define the communication between an external client server 122 and a dedicated intermediary server 110, which makes requests to the external client server 122 to retrieve information. The client specific (DBSC) configuration file also defines (1) how the requested data is to be organized at the dedicated intermediary server 110, (2) how the relations among the data are associated, and (3) formulates the constraints that are to be applied on the data. A more detailed description of the pre-configuration stage is provided below.

Operational Stage

In the operational stage, each client's database schema configuration file (DBSC) has been configured in accordance with the rules and processes described in the pre-configuration stage. In contrast to conventional approaches, where a substantial portion of the data processing tasks are performed at the client device, a substantial portion of the data processing tasks are now performed at the intermediary server 110. Client data requests, received from a plurality of clients 102a-c are received at the intermediary server 110.

In a preferred embodiment, client requests are relayed to the intermediary server 122 which in turn forwards the requests from the intermediary server 122 to the appropriate external client server 122a-c. Retrieved data is then transmitted back to the intermediary server 122 from the external client servers 122a-c in response to the requests. The intermediary server 122 then processes the raw retrieved data into a number of SQLite compatible tables as part of each client's uniquely configured DBSC configuration file, as will be more fully described below, for eventual downloading by the plurality of clients 102a-c, for eventual storage in an SQLite database on the client's mobile devices. A more detailed description of the operational stage is provided below.

System Description

With reference now to FIG. 1, this figure depicts a pictorial representation of a network data processing system in which the present invention may be implemented. Network data processing system 100 contains a network 106, which is the medium used to provide communication links between various devices and computers connected together within network data processing system 100. Network 106 may include connections, such as wire, wireless communication links, or fiber optic cables and the like.

In the depicted example, a dedicated intermediary server 110 is connected to network 106 along with storage unit 111. In addition, client devices 102a, 102b, and 102c are connected to network 106. Three of which are shown by example only. These client devices 102a, 102b, and 102c may comprise a variety of devices, for example, a mobile device (e.g., mobile phone or a smartphone), a personal computer, a laptop, a tablet, a network computer or the like. Accordingly, the various client device types may operate using a variety of operating systems (e.g., Android, iOS, Linux, Windows, etc.).

The intermediary dedicated mobile server 110 is depicted in communication with one or more external client (customer) servers 122a-b via the network 106. Two of which are shown by example only. External customer server 122 may function as an application server, such as an Oracle Server, SQL server or WebSphere Application Server from International Business Machines (IBM) Corporation. Client devices 102a, 102b, and 102c are clients to the external customer servers 122a-b. Network data processing system 100 may include additional servers, clients and other devices not shown. The intermediary dedicated mobile server 110 and external customer servers 122a-b may be dedicated computer processors or applications running on a computer processor.

Information may flow between the components illustrated in FIG. 1, or any of the elements, components and subsystems disclosed herein, using a variety of techniques. Such techniques include, for example, passing the information over a network using standard protocols, such as TCP/IP, HTTP, or HTTPS, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein. Various embodiments of the invention will now be described.

The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments Pre-Configuration With reference to FIGS. 1 and 2, in order to translate and transfer data from external client systems such as, for example, from external client servers 122a-b, via the dedicated intermediary server 110 to a client's mobile device 102a-c in a seamless and streamlined manner, a database schema configuration file (DBSC) 200 is first configured at the dedicated intermediary server 110. The database schema configuration file (DBSC) 200 shown in FIG. 2 details all aspects of the form and function of an SQLite database (a number of SQLite tables) that will be transferred to the mobile devices 102a-c, including but not limited to, all tables, indexes and data retrieval actions that define the communication between the external client servers 122a-b and the dedicated intermediary server 110 to request and retrieve information. The DBSC 200 also defines how the data is organized, how the relations among the data are associated, and formulates the constraints that are to be applied on the data.

The database schema configuration file (DBSC) 200 is configured to facilitate a conversion process that converts the raw XML data retrieved from the external client servers 122a-b into DBSC object files. The database schema configuration file (DBSC) 200 informs the intermediary server 110 regarding what tables should be built to accommodate a client's raw XML data whenever it is received from the client's external client server 122a-b.

As discussed above, the conversion process is client specific and as such modification of the DBSC file 200 typically takes different forms from client to client. For example, modifications to the DBSC file 200 may include, without limitation, (1) a client adding or removing tables from the DBSC file 200, (2) a client adjusting the indexes when viewing content on the client's device is slow, (3) a client removing an entire entity/selection block from the DBSC file 200 which would effectively remove the table and all of its contents from being downloaded to a given client device, (4) a client adding or adjusting content to an existing entity or selection. Adding content to an entity/selection is done by adding additional ACTION tags to the INITACTION XML block, as shown in FIG. 2. A client may adjust an existing ACTION tag by modifying the "methodname" and/or "beanname". Alternatively, a client may adjust an existing ACTION tag by modifying the details of the function described by the "methodname" and the "beanname", as shown in FIG. 2.

DBSC Configuration File 200

FIGS. 2a-e illustrate an exemplary DBSC configuration file 200, according to an embodiment of the invention. As stated above, the DBSC configuration file 200 is a template that is assigned to each client during the pre-configuration stage. The system allows each client to modify the DBSC configuration file 200 template according to the client's own unique data requirement needs.

Once the DBSC configuration file 200 is fully configured by a client at the completion of the pre-configuration stage, the client specific DBSC configuration file 200 is stored as a physical file in memory on a disc at the intermediary server 110 in an XML format. Notably, a client may further modify the DBSC configuration file 200 subsequent to the completion of the pre-configuration stage on an as needed basis. The modifications may be performed with or without the assistance of a system administrator.

During the operational stage, which follows pre-configuration, at startup time, as the intermediary server 110 loads, each client specific DBSC configuration file 200 is read as part of a server initialization process.

Figure 2A:
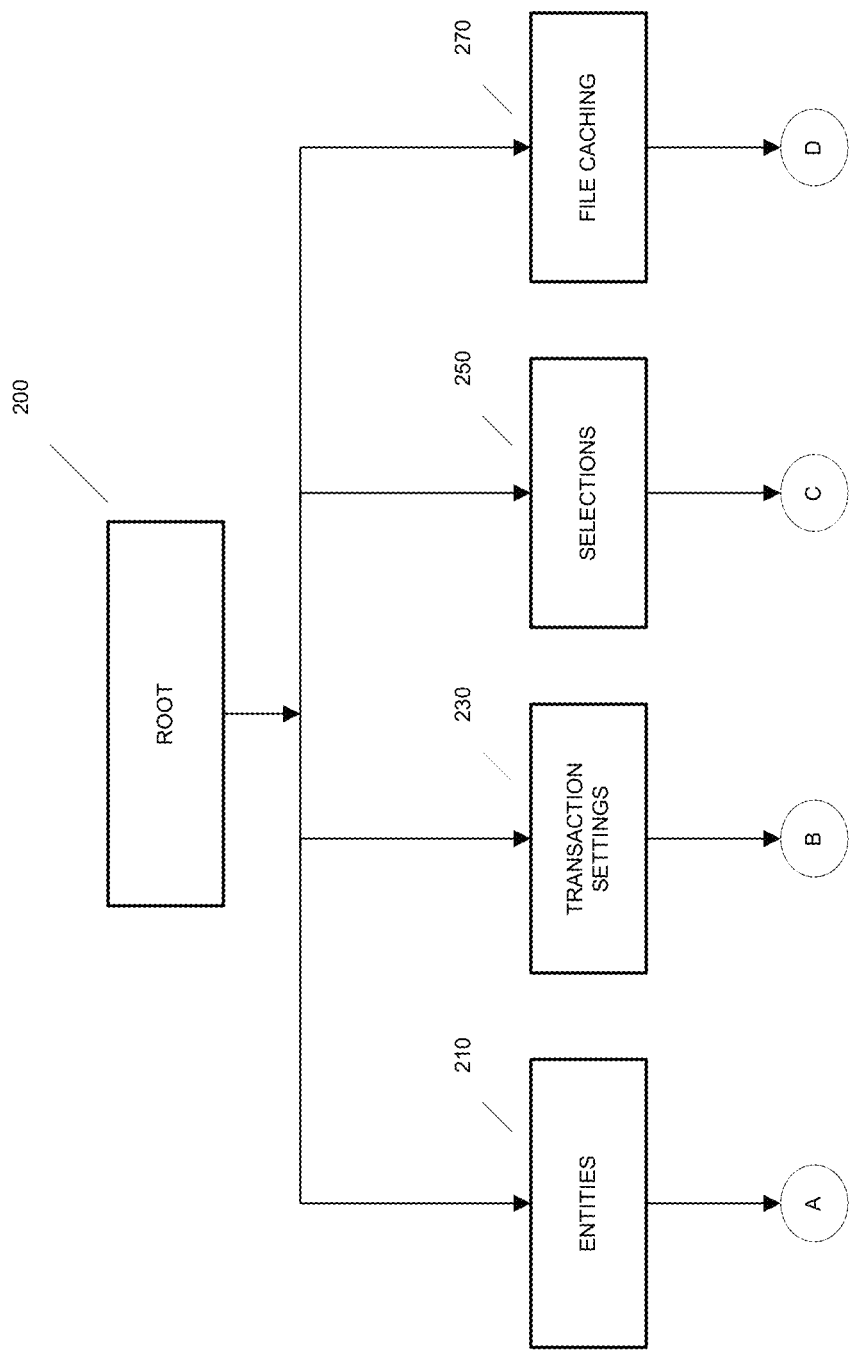
FIG. 2a-d illustrates the elements of a DBSC configuration file in accordance with one embodiment of the present invention.

FIG. 2a illustrates, by way of example, a DBSC configuration file 200 structure at a top level. The file structure is shown to consist of four client configurable sub-sections, i.e., an "Entities Settings" sub-section 210, a "Transactions Settings" sub-section 230, a "Selections Settings" sub-section 250 and a "File Caching" sub-section 270. Each client has the option of modifying each of the four sections on an as needed basis. Section descriptions for the four configurable sub-sections are provided as follows.

Entities Settings 210

Figure 2B:
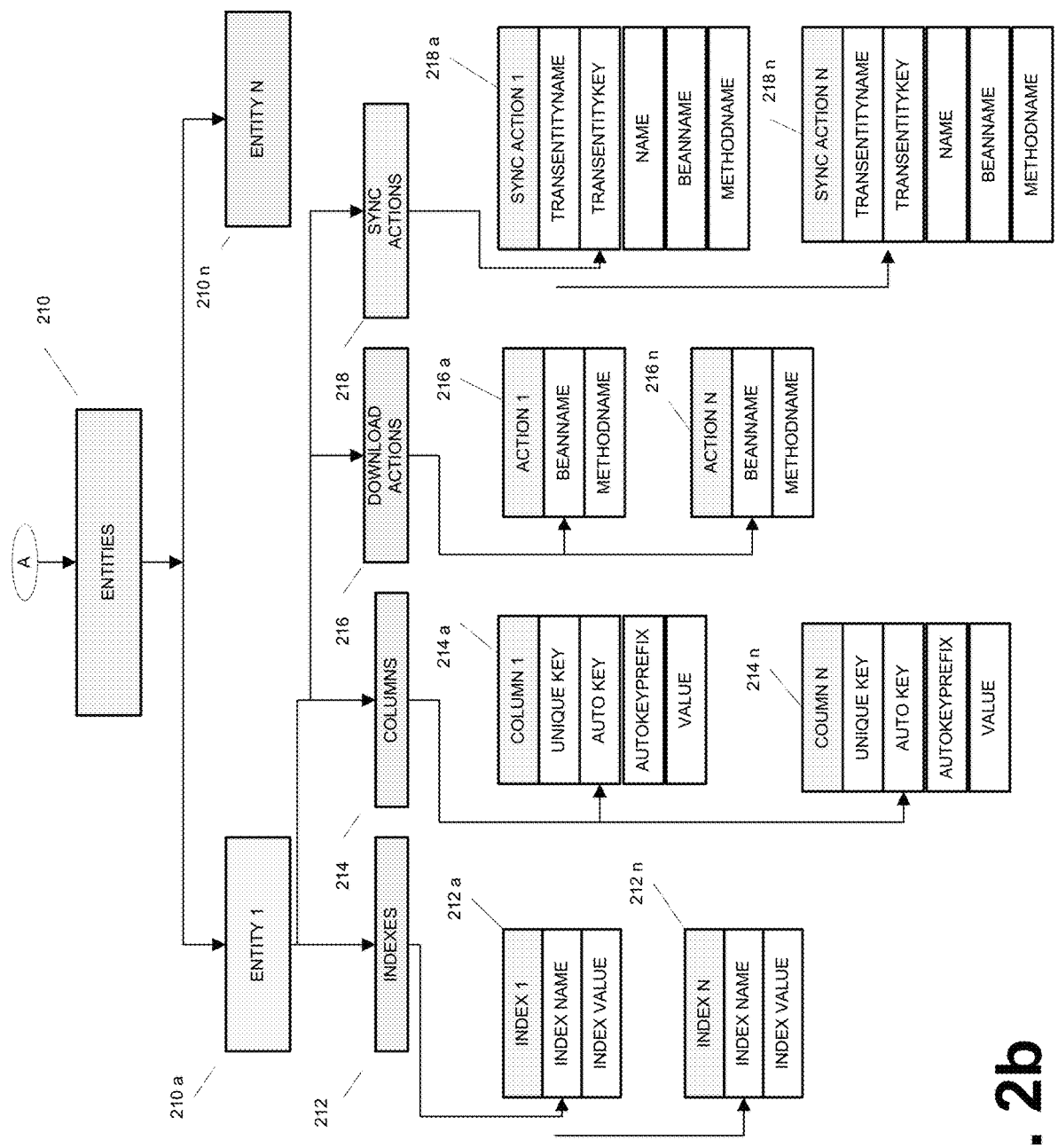

Referring now to FIG. 2b, there is shown a structural configuration of the "ENTITIES" section 210 of the DBSC configuration file 200, according to an embodiment of the invention. Entities are identified herein as the table names for data that is being transferred from the intermediary server 110 to a client device 102a-c.

As shown in FIG. 2b, the "ENTITIES" section 210 of the DBSC configuration file 200 consists a set of entity objects, e.g., ENTITY 210 (a . . . n), where each entity object is defined by:

a set of Index objects 212(a-n),
 a set of Column objects 214(a-n),
 a set of Download Action objects 216(a-n),
 a set of Sync Action objects 218(a-n).

Index Objects 212(a-n)

The set of index objects 212a-n contain xml tag data values defined in the <INDEX> xml tag. These values include: (1) an index name, and (2) an index value. Each of these xml tag data values may be configured by the client.

Column Objects 214

The set of column objects 214a-214n contain xml tag data values defined in the <COLUMN> xml tag. These values include: (1) a unique key, (2) an autokey, (3) an autokey-prefix, and (4) a value. Each of these xml tag data values may be configured by a client.

Download Action Objects 216

The set of download action objects 216a-216n contain xml tag data values defined in <DOWNLOAD ACTIONS> xml tag. These xml tag data values include: (1) a "bean-name" identifying the JAVA class and, (2) a "methodname" identifying the name of the method which is responsible for the data retrieval for a specific entity or selection. Each of these xml tag data values may be configured by a client.

Sync Action Objects 218

The set of sync actions objects 218a-218n contain xml tag values defined in the <SYNC ACTIONS> xml tag. These xml tag values include:

a "transiententity" name identifying the parent entity,
 a "transiententity" key referring to the unique column for the transient entity,
 a "transaction" name identifying a name that is generated each time a user modifies data stored on the intermediary server 110. The transaction name is linked to the "name" attribute identified on a sync action and provides a way to link the transaction and how it will be synced to the intermediary server 110
 a "beanname" identifies the JAVA class, and
 a "methodname" identifies the name of the method which is responsible for the data retrieval for a specific entity or selection.

Each of the XML tag data values above may be configured by a client.

The following exemplary code describes an entity definition for a client specified "WORKORDER" ENTITY defining the index objects, column objects, download action objects and sync action objects that make up the ENTITY section 210 for a particular client.

```xml
<ENTITY_DEFS>
    <ENTITY name="WORKORDER">
        <INDEXES>
            <INDEX name="IDX_WO_1">WORKORDERID</INDEX>
            <INDEX name="IDX_WO_2">WONUM, SITEID</INDEX>
            <INDEX name="IDX_WO_3">ASSETNUM, SITEID</INDEX>
            <INDEX name="IDX_WO_4">LOCATION, SITEID</INDEX>
        </INDEXES>
```

```xml
<COLUMNS>
    <COLUMN autokey="Y" autokeyprefix="LOCAL" parentkeycol="PARENTID" uniquekey="Y">WORKORDERID</COLUMN>
    <COLUMN autokey="Y" parentkeycol="PARENT" autokeyprefix="OFFLN">WONUM</COLUMN>
    <COLUMN sameasentity="WORKORDER" sameascol="WONUM">ORIGRECORDID</COLUMN>
    <!-- ORIGRECORDID column can be 1 to many. If from SR, this column will store TICKETID info. -->
    <COLUMN sameasentity="SR" sameascol="TICKETID">ORIGRECORDID</COLUMN>
</COLUMNS>
```

```xml
<INIT_ACTION>
    <ACTION "beanname"="OfflineInitSqlDataProviderAction" "methodname"="getMyWorkOrderListJson"/>
    <ACTION "beanname"="OfflineInitSqlDataProviderAction" "methodname"="getMyTaskWorkOrderListJson"/>
</INIT_ACTION>
```

```xml
<!--             <DELTA ACTION> -->
<!--             <ACTION "beanname"="OfflineDeltaSqlDataProviderAction" "methodname"="getDeltaMyWorkOrderListJson"/> -->
<!--             <ACTION "beanname"="OfflineDeltaSqlDataProviderAction" "methodname"="getDeltaMyTaskWorkOrderListJson"/> -->
<!--             </DELTA ACTION > -->
```

```xml
</SYNC ACTIONS >
    <ACTION transentityname="WORKORDER" transentitykey="WORKORDERID" name="INSERT" "beanname"="OfflineDataSyncAction" "methodname"="addWorkOrder"/>
    <ACTION transentityname="WORKORDER" transentitykey="WORKORDERID" name="EDIT" "beanname"="OfflineDataSyncAction" "methodname"="editWorkOrder"/>
    <ACTION transentityname="WORKORDER" transentitykey="WORKORDERID" name="INSERT_TASK" "beanname"="OfflineDataSyncAction" "methodname"="addTaskWorkOrder"/>
    <ACTION transentityname="WORKORDER" transentitykey="WORKORDERID" name="UPDATE_STATUS" "beanname"="OfflineDataSyncAction" "methodname"="updateWorkOrderStatus"/>
    <ACTION transentityname="WORKORDER" transentitykey="WORKORDERID" name="UPDATE_TASK" "beanname"="OfflineDataSyncAction" "methodname"="updateWorkOrderTask"/>
    <ACTION transentityname="WORKORDER" transentitykey="WORKORDERID" name="UPDATE_TASK_STATUS" "beanname"="OfflineDataSyncAction" "methodname"="updateWorkOrderStatus"/>
    <ACTION transentityname="WORKORDER" transentitykey="WORKORDERID" name="EMM_FILE_UPLOAD"/>
    <ACTION transentityname="WORKORDER" transentitykey="WORKORDERID" name="CLASSIFY" "beanname"="OfflineDataSyncAction" "methodname"="classifyWorkOrder"/>
    <ACTION transentityname="WORKORDER" transentitykey="WORKORDERID" name="NO_ACTION" "beanname"="OfflineDataSyncAction" "methodname"="noActionWorkOrder"/>
</SYNC ACTIONS >
```

Transaction Settings

Referring now to FIG. 2b, there is shown a structural configuration of the "TRANSACTION SETTINGS" subsection 230 of the DBSC configuration file 200, according to an embodiment of the invention. Transaction settings define the table names for transaction data that is being transferred from the intermediary server (110, 210) to a client device 102a-c, as shown in FIG. 1.

Transaction Settings values consist of XML tag values corresponding to:
- a Transaction Service Name 232 XML tag,
- a Transaction Server Time 234 XML tag and
- Download Information 236 XML tag.

Each of the XML tag data values above may be configured by a client.

Types, —defines accepted file types that can be downloaded.

Max Size MB, —the maximum file size that is allowed to be downloaded.

EXP Days. —defines the number of days an unviewed attachment can be stored before it gets deleted.

The following exemplary code describes the transaction settings definition specified. This exemplary code identifies specific web services for the user's mobile device to communicate to the intermediary server. The code also defines acceptable file types for the attachment downloading web service.

```
<TX_SETTINGS>
    <TX_SERVICE_NAME
batchsize="1">offline/doUploadOfflineData.action</TX_SERVICE_NAME>
    <TX_SERVER_TIME
retelement="TXTIMESTAMP">offline/getTxTimeStamp.action</TX_SERVER_TIME>
        <DOWNLOADS pollinterval="20" trylimit="10">
            <DB_DOWNLOAD>offline/getSQLite.action</DB_DOWNLOAD>
            <DELTA_DOWNLOAD>offline/getDeltaSQLite.action</DELTA_DOWNLOAD>
            <RESOURCE_DOWNLOAD>offline/getResource.action</RESOURCE_DOWNLOAD>
            <ATTACHMENT_UPLOAD>doclinks/uploadDoclink.action</ATTACHMENT_UPLOAD
>
            <ATTACHMENT_DOWNLOAD>
                <ACTION>offline/getAttachments.action</ACTION>
    <TYPES>PDF,TXT,DOC,DOCX,PNG,GIF,JPG,CSV,XLS,XLSX</TYPES>
                <MAX_SIZE_MB>1</MAX_SIZE_MB>
                <EXP_DAYS>30</EXP_DAYS>
            </ATTACHMENT_DOWNLOAD>
        </DOWNLOADS>
    </TX_SETTINGS>
```

Transaction Service Name 232

The transaction service name 232 contains xml tag data values defined in the <TRANSACTION SERVICE NAME> xml tag. These values include: (1) "batchsize", and (2) an index value. The "batchsize" refers to the number of offline top level transactions grouped with all their children transactions and sent to the intermediary server. As defined herein, a transaction is a data modification event performed offline by a user.

Each of the following xml tag data values may be configured by a client.

Transaction Server Time 234

The Transaction Server time object 234 contain xml tag data values defined in the <TRANSACTION SERVER TIME> xml tag. These values include: (1) a retelement, (2) a value. Each of these xml tag data values may be configured by a client. Retelement is a key/property for the user device 102a-c to know which property to parse when receiving the JSON data back from the 'getTxTimeStamp" call. Each of these xml tag data values may be configured by the client.

Download Information 236

A set of Download action objects 236a-236n include xml tag data values defined in <DOWNLOAD ACTIONS> xml tag. These xml tag data values include:
- an Attachment Upload, —a webservice used to upload attachments (e.g., photos/videos) captured offline.
- a DB Download, —a webservice that is used to initiate the start of the "downlink process."
- a Resource Download, and
- an Attachment Download, —further comprising xml tag data values including:
  - Action, —a webservice defined for downloading attachments offline (e.g., images, documents, files).

Selection Settings

Figure 2C:
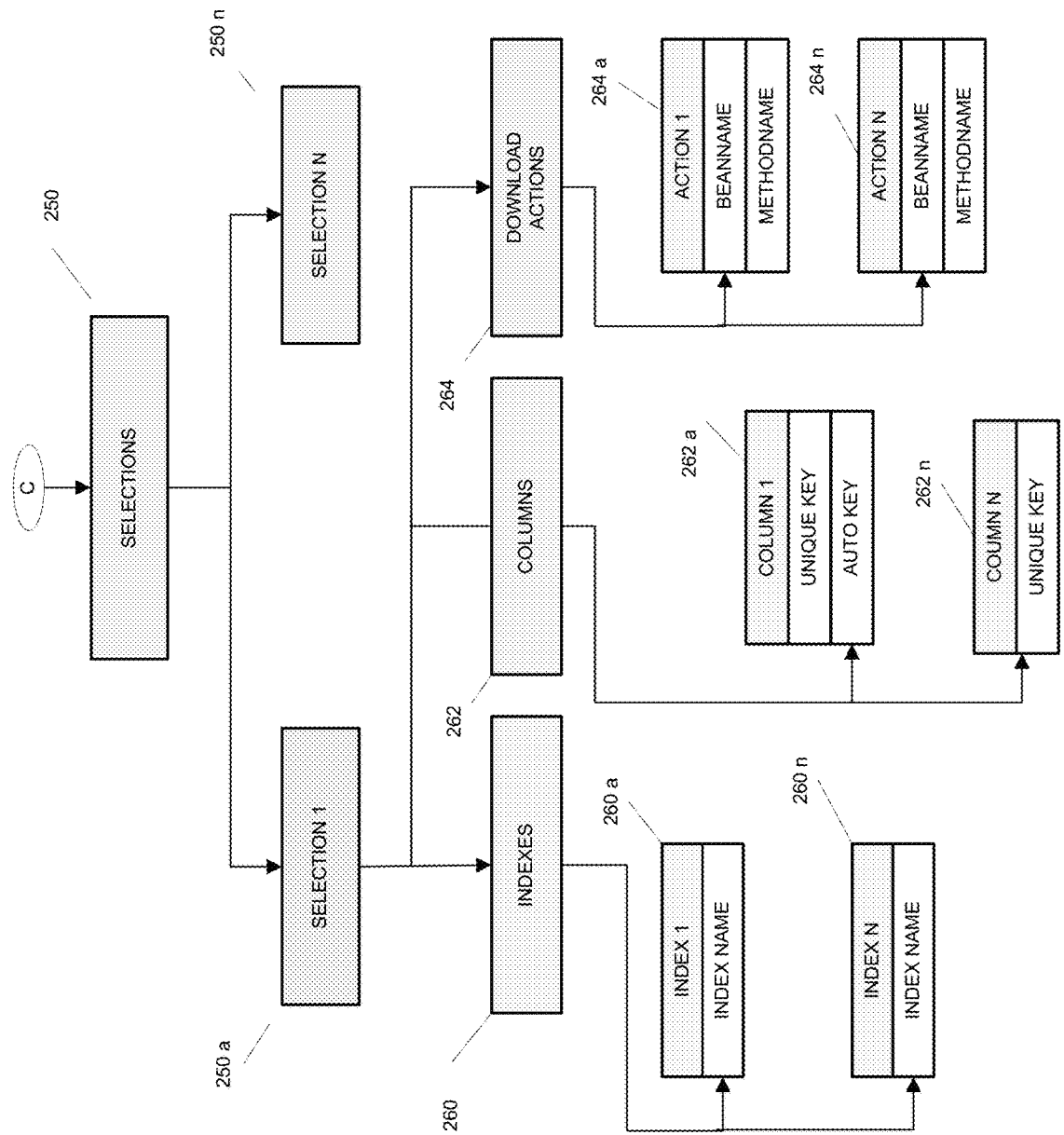

Referring now to FIG. 2c, there is shown a structural configuration of the "SELECTIONS SETTINGS" section 250 of the DBSC configuration file 200, according to an embodiment of the invention.

As shown in FIG. 2c, this section consists of a set of selection objects 250(a-n), each selection object further including a set of index objects 260(a-n), a set of column objects 262(a-n) and a set of download action objects 264(a-n).

Index Objects 260(a-n)

The set of index objects 260a-n contain xml tag data values defined in the <INDEX> xml tag. These values include: (1) an index name, and (2) an index value. Each of these xml tag data values may be configured by a client.

Column Objects 262(a-n)

The set of column objects 262(a-n) contain xml tag data values defined in the <COLUMN> xml tag. These values include: (1) a unique key, (2) an autokey, and (3) a value. Each of these xml tag data values may be configured by a client.

Download Action Objects 264(a-n)

The set of download action objects 264a-n contain xml tag data values defined in <DOWNLOAD ACTIONS> xml tag. These xml tag data values include: (1) a "beanname" identifying the JAVA class and, (2) a "methodname" identifying the name of the method which is responsible for the data retrieval for a specific entity or selection. Each of these xml tag data values may be configured by a client.

The following exemplary code describes a selection definition for a client specified "WORKORDER" ENTITY defining the index objects, column objects and download action objects that make up the Selection settings section 250 for a particular client.

```
<SELECTION name="LOCATIONS">
    <INDEXES>
        <INDEX name="IDX_LOC_1">LOCATION, SITEID</INDEX>
        <INDEX name="IDX_LOC_2">LOCATION</INDEX>
        <INDEX name="IDX_LOC_3">SITEID</INDEX>
    </INDEXES>
    <COLUMNS>
        <COLUMN uniquekey="Y">LOCATIONSID</COLUMN>
    </COLUMNS>
    <INIT_ACTION>
        <ACTION beanname="OfflineCachedDataProviderAction" methodname="cacheLocations"/>
    </INIT_ACTION>
</SELECTION>
```

File Caching

Figure 2D:
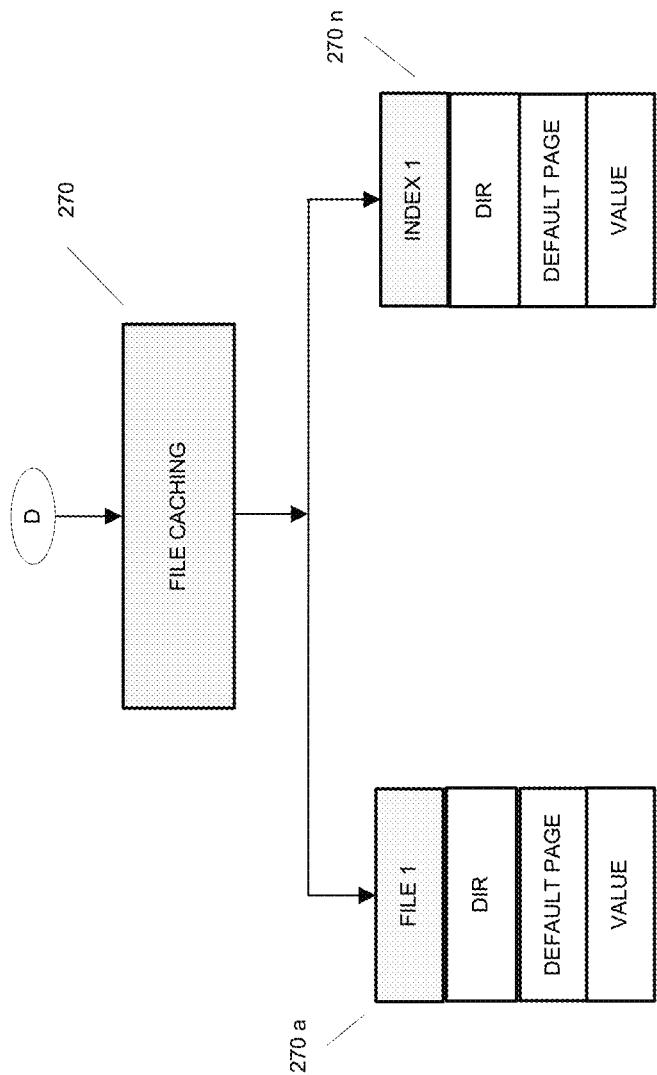

Referring now to FIG. 2d, there is shown a structural configuration of the "FILE CACHING" section 270 of the DBSC configuration file 200, according to an embodiment of the invention. The File Caching section 270 relates to the communication between the dedicated intermediary server 110 and the client's mobile device 102a-c for downloading the necessary application files. The files are cached and are only re-downloaded when a file comparison is performed and differences are found.

As shown in FIG. 2d, the "FILE CACHING" section 270 consists of a set of a FILE objects 270a-n.

FILE Objects 270(a-n)

The set of FILE objects 270a-n include xml tag data values including:
- a DIR value—a relative file path which indicates a folder where all subsequent files will be downloaded
- a DEFAULT PAGE—identifying the first page visible when offline.
- a VALUE—a file filter indicating what files in the specified "dir" will be downloaded The following exemplary code describes an entity definition for the "OFFLINE FILE CACHE" section. This section describes the default start page and file directory where the files are contained on the dedicated intermediary server 110, and a file expression filter which describes which files will be cached based on the file's name and file extension type.

```
<OFFLINE_FILE_CACHE>
    <FILE dir="offline/login" defaultstartpage="Y">default.htm</FILE>
    <FILE dir="offline/login">*.*</FILE>
    <FILE dir="offline/classes">*.*</FILE>
    <FILE dir="offline/services">*.*</FILE>
    <FILE dir="offline/common">*.*</FILE>
    <FILE dir="offline/doclinks">*.*</FILE>
    <FILE dir="offline/doclinks/services">*.*</FILE>
    <FILE dir="offline/wotrack">*.*</FILE>
    <FILE dir="offline/wotrack/services">*.*</FILE>
    <FILE dir="offline/wplabor">*.*</FILE>
    <FILE dir="offline/wplabor/services">*.*</FILE>
    <FILE dir="offline/tooltrans">*.*</FILE>
    <FILE dir="offline/tooltrans/services">*.*</FILE>
    <FILE dir="offline/wpmaterial">*.*</FILE>
    <FILE dir="offline/wpmaterial/services">*.*</FILE>
    <FILE dir="offline/labtrans">*.*</FILE>
    <FILE dir="offline/labtrans/services">*.*</FILE>
    <FILE dir="offline/labrep">*.*</FILE>
    <FILE dir="offline/labrep/services">*.*</FILE>
    <FILE dir="offline/matusetrans">*.*</FILE>
    <FILE dir="offline/matusetrans/services">*.*</FILE>
    <FILE dir="offline/worklog">*.*</FILE>
    <FILE dir="offline/worklog/services">*.*</FILE>
    <FILE dir="offline/invbalances">*.*</FILE>
    <FILE dir="offline/invbalances/services">*.*</FILE>
    <FILE dir="offline/inventor">*.*</FILE>
    <FILE dir="offline/inventor/services">*.*</FILE>
    <FILE dir="offline/invissue">*.*</FILE>
    <FILE dir="offline/invissue/services">*.*</FILE>
    <FILE dir="offline/sr">*.*</FILE>
    <FILE dir="offline/sr/services">*.*</FILE>
    <FILE dir="offline/asset">*.*</FILE>
    <FILE dir="offline/asset/services">*.*</FILE>
    <FILE dir="offline/createdr">*.*</FILE>
    <FILE dir="offline/createdr/services">*.*</FILE>
    <FILE dir="offline/viewdr">*.*</FILE>
    <FILE dir="offline/viewdr/services">*.*</FILE>
    <FILE dir="javascript">*.*</FILE>
    <FILE dir="javascript/localization">*.*</FILE>
    <FILE dir="css">*.*</FILE>
    <FILE dir="css/fonts">*.*</FILE>
    <FILE dir="images">*.*</FILE>
    <FILE dir="offline/startcenter/services">*.*</FILE>
    <FILE dir="offline/startcenter">*.*</FILE>
    <FILE dir="offline/query">*.*</FILE>
    <FILE dir="offline/query/services">*.*</FILE>
    <FILE dir="offline/classification">*.*</FILE>
    <FILE dir="offline/classification/services">*.*</FILE>
</OFFLINE_FILE_CACHE>
```

Operational Stage

In the operational stage a plurality of clients 102a-c make data requests, via the dedicated intermediary server 110, to the client's external enterprise server 122 (e.g., Oracle or SQL server). Raw customer data is retrieved by each of the respective external client servers 122a-c and transmitted to the dedicated intermediary server 110 where it is processed and converted at a last stage to an SQLite format that can be used by any client device 102a-c. As will be described more fully below, the dedicated intermediary server 110 is configured to output a SQLite file comprising one or more SQLite compatible tables in satisfaction of a client data request. The SQLite compatible tables are downloaded by the clients to be stored in an SQLite database on the client's mobile device 102a-c.

The conversion of raw customer data to one or more SQLite compatible tables is facilitated by the Database schema configuration file (DBSC) 200, which resides at the intermediary server 110.

The conversion of raw XML data to one or more SQLite compatible tables as part of a client specific DBSC configuration file 200 is accomplished at the intermediary server 110 by a set of functional modules ("Cx") and a set of edge modules ("Ex"), described as follows.

Figure 3:
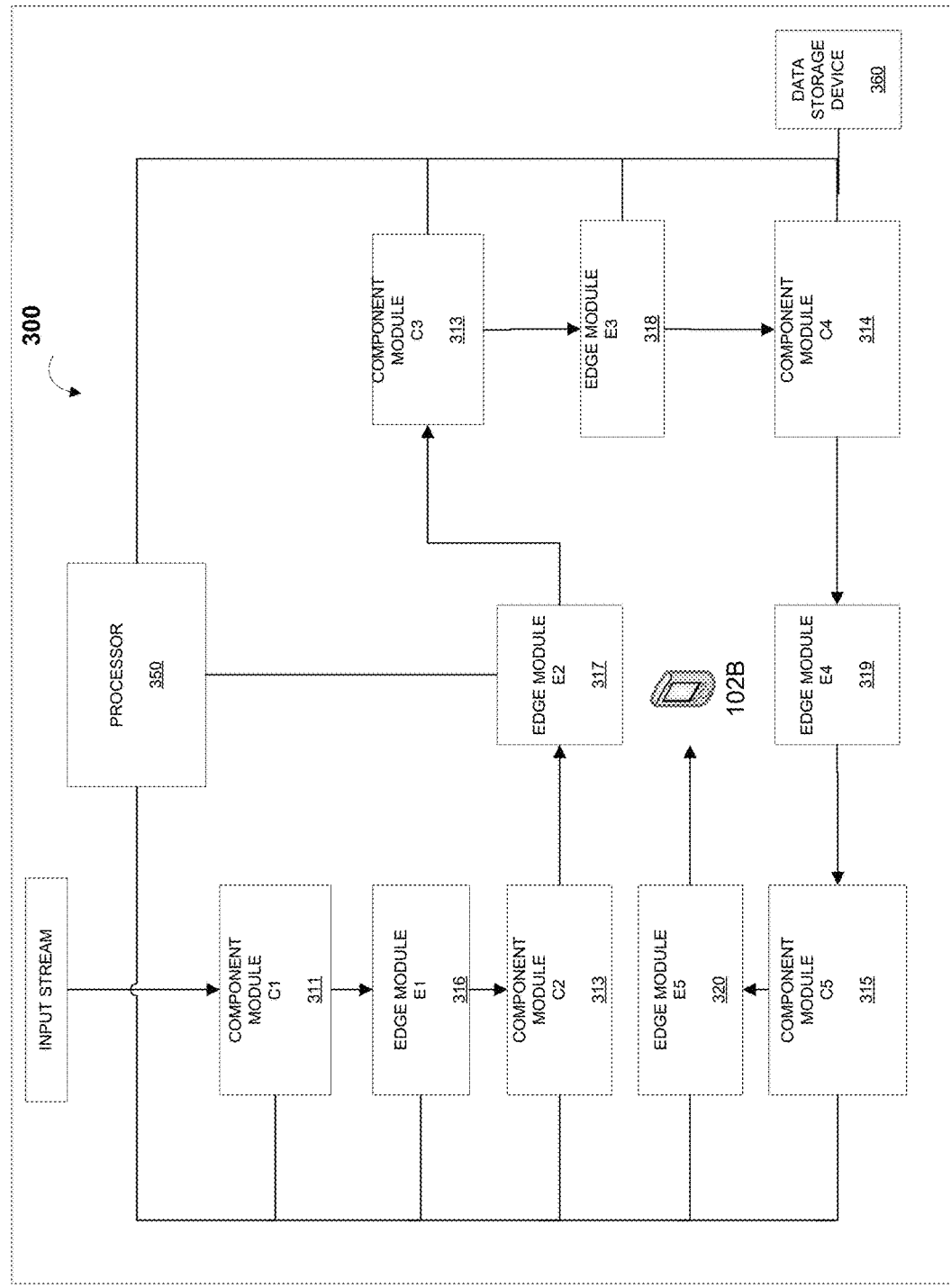
FIG. 3 is a simplified block diagram of one embodiment of the dedicated mobile server shown in FIG. 1.

FIG. 3 depicts an exemplary embodiment of a particular set of functional modules (C1-C5) and edge modules (E1-E5) as part of the intermediary server 110, in accordance with an embodiment of the present invention. As used herein, a generic functional module ("Cx") is an element whose existence is to perform and complete a specified task. A task is initiated by an edge module or by an outside trigger (e.g. a user or system). As used herein, a generic edge module ("Ex") is a designator between two functional modules ("Cx" and "Cx+1") configured to define the completion of the current functional module ("Cx"), perform one or more functionalities (e.g.: initiation, transfer, delegation), and determine the next functional module to process the raw client data. Completion of a functional module will inform that module's associated outfacing edge to begin and may also output data.

As shown in FIG. 3, the dedicated intermediary server 110 utilizes one or more processors 350, one of which is shown for ease of description, for executing all applications, software, circuits, algorithms and enabling all functions associated with functional modules (C1-C5) and edge modules (E1-E5). The dedicated intermediary server 110 additionally includes an electronic data storage device (ESD) 360 for electronically storing the database schema configuration file (DBSC) 200 and other applications, data, information and algorithms as may be required to carry out the full functionality of the invention.

The one or more processors 350 are shown coupled to each of the functional modules (C1-C5), edge modules (E1-E5) and data storage device 360. Each functional module (C1-C5) is configured to perform a specific task initiated by the one or more edge modules (E1-E5) which are configured as designators situated between the functional modules (C1-C5) and perform a number of functions including defining the completion of a functional module (C1-C5). Additionally, the edge modules (E1-E5) may perform one or more functionalities associated with the functional modules (C1-C5). In some embodiments, the functionalities performed by the edge modules (E1-E5) may include, for example, initiation, transfer, and delegation, as will be described further below. In certain embodiments, initiation of a task may be triggered by an external user or system.

Functional Description of Modules (C1-C5) and (E1-E5)

The functionality performed by functional modules C1-C5 may be performed by processing logic that may comprise hardware (e.g., circuitry, dedicated logic, programmable logic, microcode, etc.), software (such as instructions run on a processing device), or a combination thereof, such as firmware or functional circuitry within hardware devices.

Edge Module E1 (START,C2)

Edge module E1 of dedicated intermediary server 110 initiates the start of the data transfer process. A client or the system can invoke the functionality to be executed.

Functional Module C1

Functional module C1 of dedicated intermediary server 110 utilizes input streams (e.g., raw data) received from the client's external enterprise server 122 to read the client's Database schema configuration file (DBSC), which is then stored into memory for use by other functional modules.

Edge Module E1 (C1,C2)

Edge module E1 of dedicated intermediary server 110 sends the database schema configuration file (DBSC) in JAVA byte format to functional module C2.

Functional Module C2

Functional module C2 of dedicated intermediary server 110 reads the database schema configuration file (DBSC) sent from edge module E1 via a file input stream. Functional module C2 then converts the database schema configuration file (DBSC) converted into a more readable and usable object structure by parsing the Database schema configuration file (DBSC) into an object structure including the retrieval of indexes, unique columns, and data retrieval actions. The object structure is then used by functional module C4, as described below, to execute the start of defined data retrieval actions which includes establishing a connection with the client's external enterprise system 122, thereby making the raw data ready to be retrieved by the intermediary server 110 from the client's external enterprise server 122.

In one embodiment, an XML parsing library is used to parse the content of the database schema configuration file (DBSC) from the file input stream. After the XML is parsed, the elements of each XML component is extracted to a corresponding JAVA object that requires traversing through the XML's hierarchical structure, and for each element in the XML, storing its content in a JAVA Object. JAVA objects include, entity objects, selection objects, index objects, column objects, init actions, file and TX settings, as shown and described with reference to FIG. 2.

Edge Module E2 (C2,C3)

Edge module E2 of dedicated intermediary server 110 forwards a formatted DBSC file identified as a Plain Old Java Object (POJO) containing data of the raw bytes.

Functional Module C3

Functional module C3 of dedicated intermediary server 110 establishes a connection with the client's external enterprise server 122.

Edge Module E3

Edge module E3 of dedicated intermediary server 110 invokes the start of the data retrieval process by passing the formatted DBSC file to functional module C4.

Functional Module C4

Functional module C4 of dedicated intermediary server 110 retrieves raw data from the client's external enterprise server 122 in response to a client request, stores the raw retrieved data into a local memory 111 in a format ready for processing into a local SQLite database using an embedded database engine. Processing includes, creating columns and indexes. If the data retrieval actions overlap the same table, column conflicts are handled. Functional module also encrypts the locally formatted data in the local SQLite database.

Edge Module E4 (C4,C5)

Edge module E4 of dedicated intermediary server 110 receives the raw data from functional module C4 and outputs the raw data into component C5. Raw data can consist of, for example, a JDBC result set data from an executed query, or JSON formatted data from an external system other than a database.

Functional Module C5

Functional Module C5 of dedicated intermediary server 110 that downloads the encrypted SQLite database to the client.

Edge Module E5 (C5, DEVICE)

Edge module E5 of dedicated intermediary server 110 sends a processed SQLite database from functional module C5 to the client's mobile device 102a-c in accordance with the HTTP file transfer protocol.

Figure 4:
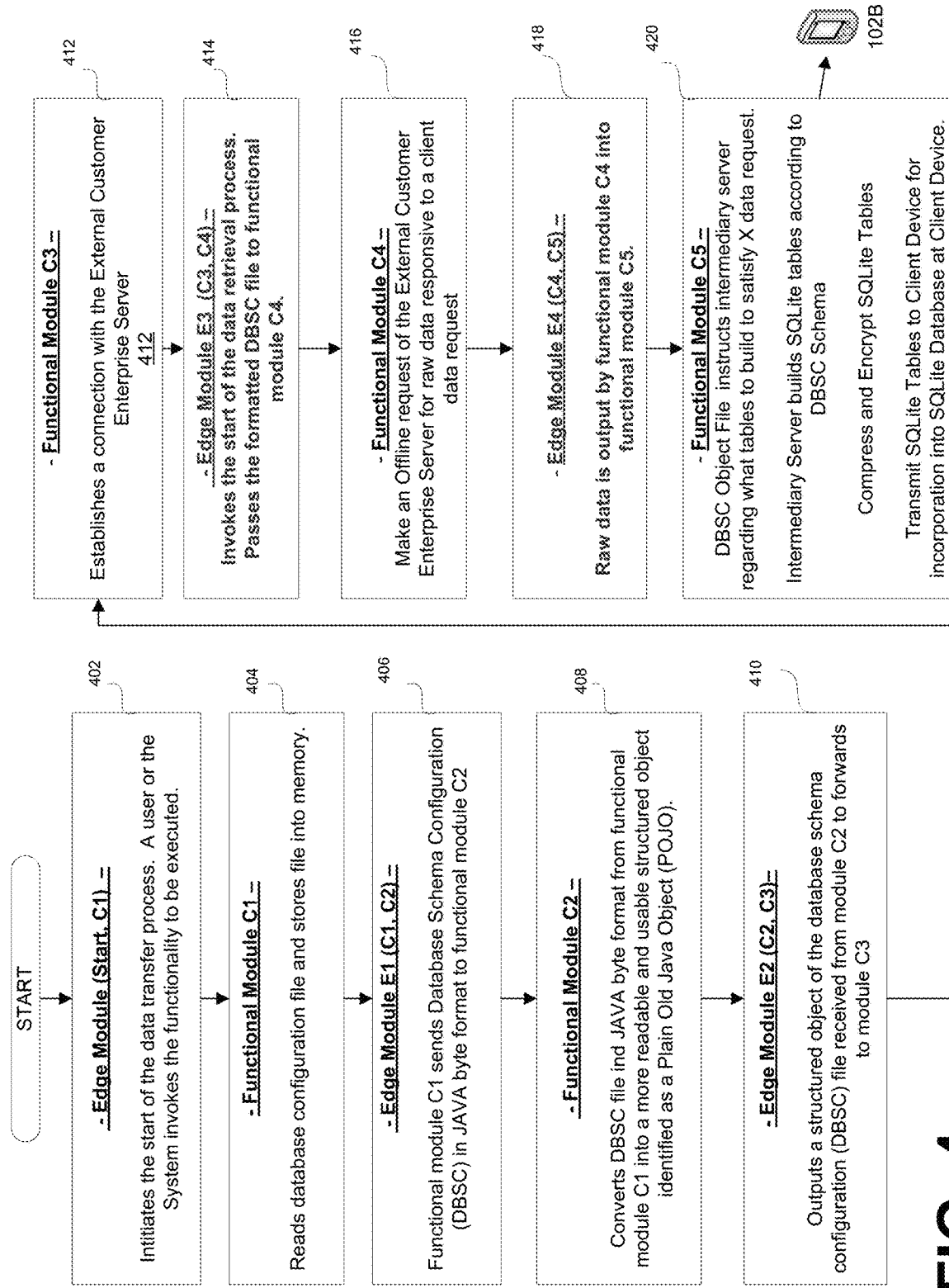
FIG. 4 is a flow diagram illustrating processing of data received from the external customer server in the dedicated mobile server in accordance with one embodiment of the present invention.

FIG. 4 is a flow diagram illustrating a method 400 invoked by the configurable dedicated intermediary server 110 for downloading raw XML data from the client's external enterprise server 122a-b and structuring the raw XML data into a more readable and usable structure, as discussed above with reference to functional modules C3 and C4.

Method 400 may be performed by processing logic that may comprise hardware (e.g., circuitry, dedicated logic, programmable logic, microcode, etc.), software (such as instructions run on a processing device), or a combination thereof, such as firmware or functional circuitry within hardware devices.

At block 404, functional module C1 of dedicated server 110 is invoked to read a database schema configuration file (Database schema configuration file (DBSC)), and stores the configuration file into memory for use by other functional modules. Component C1 utilizes input streams received from the client's external enterprise server 122 to read the database schema configuration (DBSC) file.

At block 406, edge module E1 of dedicated server 110 outputs the database schema configuration (DBSC) file from functional module C1 and inputs the file into functional module C2. The operation can be characterized as: {C1.E1.C2}.

At block 408, functional module C2 converts the database scheme configuration (DBSC) file received from component C1 and converts the file into a more readable and usable structure. Specifically, functional module C2 parses the DBSC configuration file and retrieves: indexes, unique columns and data retrieval actions from the configuration file to yield a parsed DBSC configuration file. Functional module C2 then creates a Java Object from the parsed DBSC configuration file for a particular client.

The Appendix lists 3 exemplary Java Objects that may be created by functional module C2.

At block 410, edge module E2 outputs a structured object of the parsed DBSC configuration file from functional module C2 and inputs the parsed DBSC configuration file into functional module C3. The operation can be characterized as: {C2.E2.C3}.

At block 412, functional module C3 establishes a connection with the external system to retrieve raw data and utilizes the object structure from the parsed DBSC configuration file to execute the start of defined data retrieval actions.

At block 414, edge module E3, the operation can be characterized as: {C3.E3.C4}.

At block 416, functional module C4 retrieves raw data from external system.

At block 418, edge module E4. This operation can be characterized as: {C4.E4.C5}.

At block 420, functional module C5 utilizing an SQLite embedded database engine processes the raw data in a SQLite database. Columns and indexes are created, and its associated data is inserted into the database. In one aspect, if the data retrieval action overlaps the same table, column conflicts are handled.

Load Balancing

Figure 5:
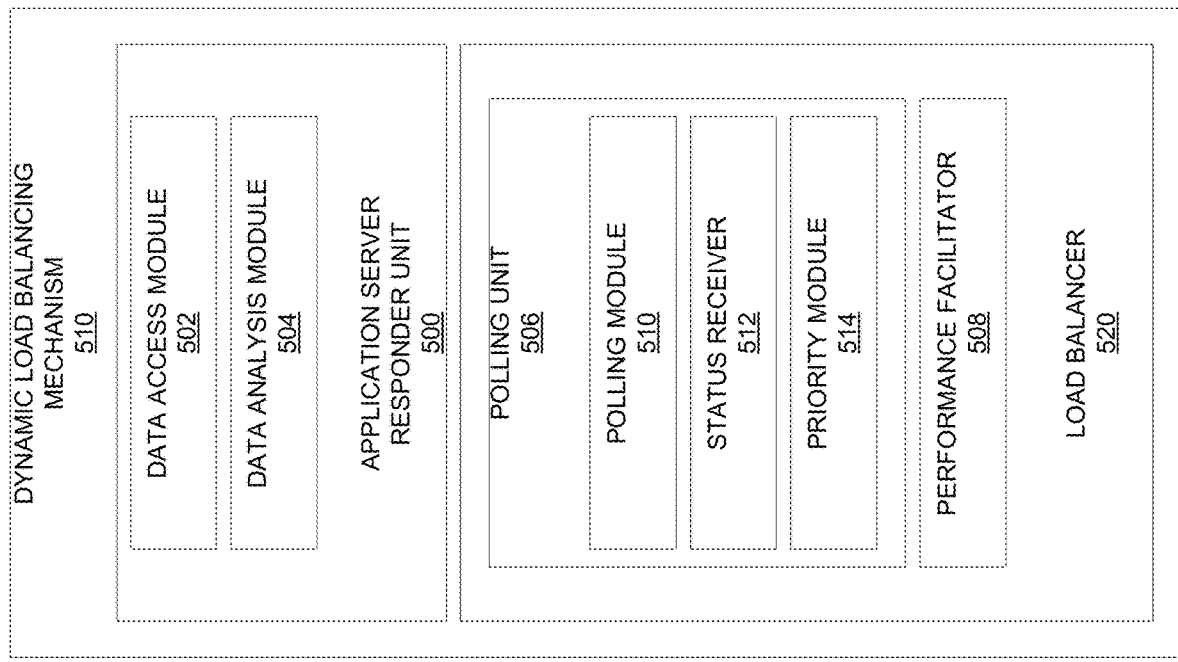
FIG. 5 illustrates a dynamic load balancing mechanism employed at a computing device according to one embodiment.

FIG. 5 illustrates a dynamic load balancing mechanism employed at a computing device according to one embodiment. Dynamic load balancing mechanism 510 includes an application server responder unit ("responder unit") 500 having components 502 and 504, and a load balancer 520 having various components 506, 508, 512 and 514 to offer a number of services to facilitate management of workload, including dynamic load balancing, at dedicated server 110 of network 100. This provides an efficient solution to problems associated with various conventional load balancing techniques so that a fair distribution of workload can be achieved.

Figure 6:
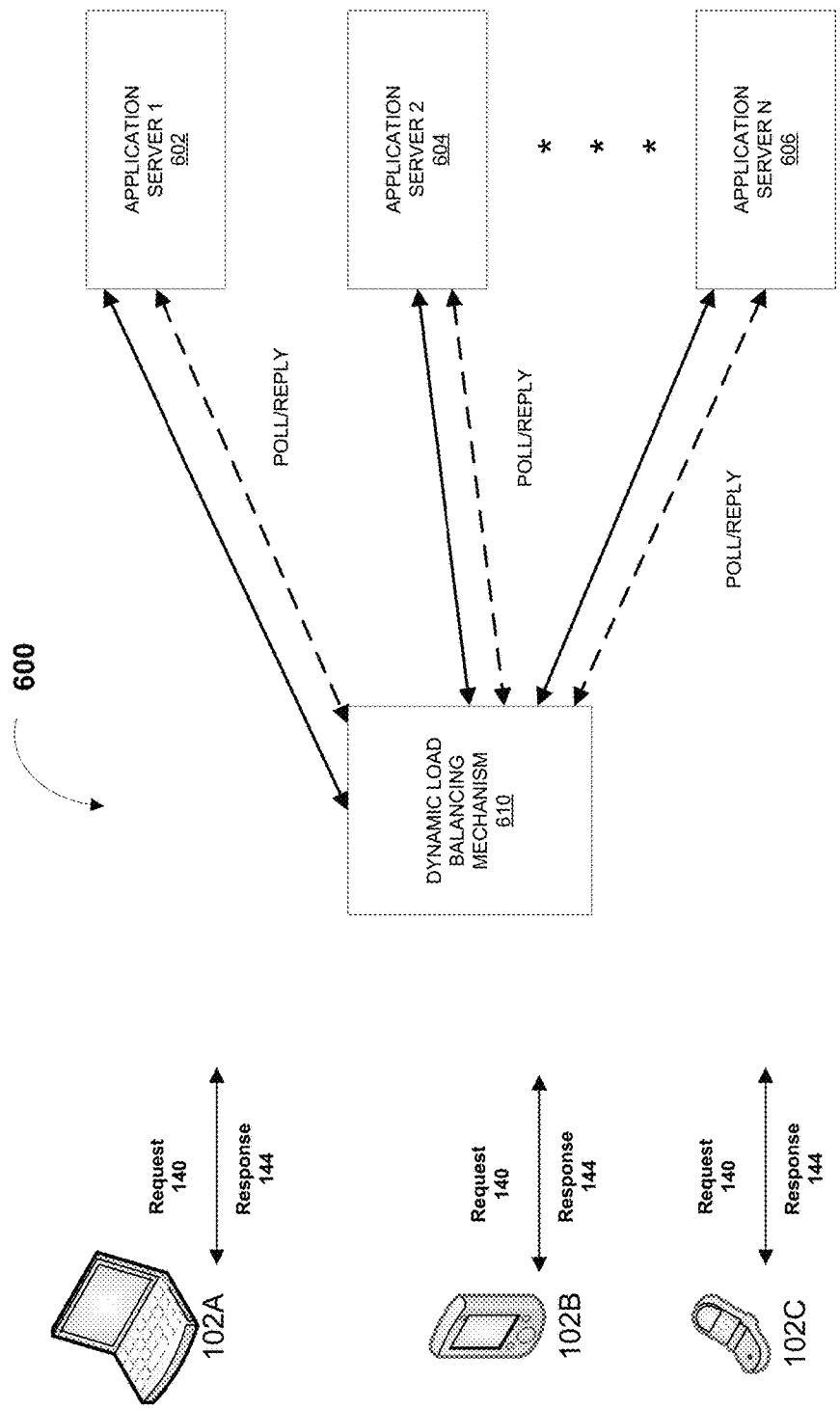
FIG. 6 illustrates a dynamic load balancing mechanism serving as a load balancer for multiple application servers according to one embodiment.

In one embodiment, the responder unit 500 may be employed at application servers 11 may be used by the dedicated server 110, as shown in FIGS. 5 and 6 to access the relevant data or information provided by one or more application servers. For example, an application server may provide certain details about an application server, such as the amount of requests in the queue, the number of responses to requests performed during a given period of time, etc. Once the data is accessed by the data access module 502, it is then analyzed by a data analysis module 504 of the responder unit 500. This way, the dedicated server 110 maintains information about the application server as retrieved from (or based on) the data provided by the application servers.

In one embodiment, a polling module 510 of the polling unit 506 polls or pings the application servers to determine their status, such as to check whether an application server is ready to service requests from users. In one embodiment, polling is used periodically and can be configured based on a client implementation. The polling process does not use a predetermined schedule or pushing mechanism.

The polling may be performed periodically (such as based on a predetermined schedule as set forth by a system administrator) or as necessitated by a computing system and/or as desired by the system administrator, etc. In response to the polling, based on the aforementioned data analysis, an application server sends a response back to the polling unit 406 indicating its status, such as simply whether it is available or not or providing a more detailed response including the level of its availability.

Based on the responses received from the application servers, in one embodiment, a priority module 514 of the polling unit 506 assigns various priority levels to the application servers. The assigned priority levels may simply be assigned numbers, such as first, second, third, etc., indicating the status and/or level of availability of each application server. For example, a highest priority is assigned by the dynamic load balancing mechanism 510 to one or more application servers that in comparison with other application servers, report more availability during the last or any particular interval of time with the least amount of traffic. As aforementioned, such determinations are made and conclusions are reached based on the data provided by {subsidiary servers} as accessed by the data access module 502 and analyzed by the data analysis module 404 of the responder unit 500 at each application server. Once the priorities have been assigned, a performance facilitator 508 facilitates load balancing at the relevant application servers according to their assigned priorities, such as an application server with the highest priority is assigned the user request before other application servers and so forth.

It is contemplated that any number and type of components may be added to and removed from the dynamic load balancing mechanism 510 to facilitate its workings and operability in facilitating dynamic load balancing at application servers. For brevity, clarity, ease of understanding and to focus on dynamic load balancing mechanism 510, many of the conventional or known components of a computing device are not shown or discussed here.

Dynamic Load Balancing

FIG. 6 illustrates a dynamic load balancing mechanism serving as a load balancer for multiple application servers according to one embodiment. In the illustrated embodiment, the dynamic load balancing mechanism 610 is in communication with multiple application servers, e.g., server 1, server 2, server N, 602, 604, 606 as referenced by solid arrows between them. As illustrated by another solid arrow between a user-based computing device 102A, 102B, 102C, the load balancing mechanism 610 that a request is received, at the load balancing mechanism 510, from a computing device 102A, 102B, 102C, (as placed by a user using an interface, such as a Graphical-User Interface (GUI)-based interface, etc.). The request is processed by the load balancing mechanism 610 such that load balancing of multiple application servers 602, 604, 606 is performed based on a capacity measure (e.g., next available server with least amount of traffic load) of these application servers 602, 604, 606. In one embodiment and as illustrated by the dotted arrows, the application servers 602, 604, 606 are periodically polled by the polling unit 506 (as shown in reference to FIG. 5) of the load balancing mechanism 510 to determine their status, including availability and capacity, etc., and in response, using the application server responding unit 500 (as shown in reference to FIG. 5), each application server 502, 504, 506 provides its status back to the load balancing mechanism 510. Using the status, the load balancing mechanism 510 assigns a priority level 512 to each application server 602, 604, 606 based on its corresponding status. Stated differently, using this dynamic assignment of priorities, a fair load balancing or distribution of workload at the applications servers 602, 604, 606 can be achieved, which can result in an increasingly better response time and promote efficient workload leveling (e.g., Central Processing Unit (CPU) and memory utilization) of the application servers 602, 604, 606.

The acts included in these processes may be performed by, or using, one or more computer systems configured as discussed herein. Some acts are optional and, as such, may be omitted in accord with one or more examples. Additionally, the order of acts can be altered, or other acts can be added, or various combinations of acts may be utilized, without departing from the scope of the systems and methods discussed herein. Therefore, the claims are not limited to the specific examples or order described herein. Furthermore, various modifications and rearrangements may be made without departing from the spirit and scope of the underlying inventive concept. For example, the acts may be performed on any of a number and/or types of mobile devices configured according to the examples and embodiments disclosed herein.

Further, the purpose of the Abstract is to enable the U. S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the claims of the application nor is intended to be limiting on the claims in any way.

The invention claimed is:

1. A system for interacting with at least one external client server that is accessible via
a wireless network, comprising:
at least one external client server having raw client data stored thereon,
an intermediate server connected between the at least one external client server and a plurality of clients, the intermediate server configured to perform functions associated with executing client data requests directed to the at least one external client server, including:
configuring a database schema configuration (DBSC) file unique to each client during a pre-configuration stage, wherein the DBSC file informs the intermediate server regarding what tables to build to accommodate the client data received from the at least one external client server prior to forwarding the data to the plurality of clients in response to client data requests,
converting client data retrieved from the at least one external client server into one or more SQLite compatible tables, stored as a SQLite file as part of each client's uniquely configured DBSC configuration file,
encrypting the SQLite file, and
downloading the encrypted SQLite file for eventual storage in an SQLite database on the client's mobile devices.

2. The system of claim 1, wherein the raw client data stored on the at least one external client server comprises raw XML data.

3. The system of claim 1, wherein the database schema configuration (DBSC) file details all aspects of the form and function of said number of SQLite compatible tables that will be transferred to the plurality of clients responsive to client data requests, wherein said aspects include all tables, indexes and data retrieval actions that define communications between the at least one external client server and the intermediate server.

4. The system of claim 1, wherein the conversion of the raw client data retrieved from the at least one external client server into an encrypted SQLite file comprised of said number of SQLite compatible tables as part of each client's uniquely configured DBSC configuration file comprises:
reading the DBSC file via a file input stream,
parsing the contents of the DBSC file from the file input stream using an XML parsing library,
extracting the elements of each XML component of the DBSC file to be stored in a corresponding JAVA Object to create a formatted DBSC file as a JAVA Object structure,
using the formatted DBSC file to execute the start of defined data retrieval actions from the at least one external client server, including establishing a connection with the at least one external client server, thereby making the raw client data ready to be retrieved by the intermediate server,
creating a SQLite file as part of each client's uniquely configured DBSC configuration file.

5. The system of claim 1, wherein a JAVA Object includes, entity objects, selection objects, index objects, column objects, init actions, file and TX settings.

6. The system of claim 1, wherein the created SQLite file is an encrypted SQLite file.

7. A database schema configuration (DBSC) file uniquely assigned to each client during a pre-configuration stage, the DBSC file configured at an intermediate server detailing all aspects of one or more SQLite compatible tables to be transferred to client mobile devices, including all tables, indexes and data retrieval actions that define the communications between a client's external client server and the intermediate server to request and retrieve information.

8. The database schema configuration (DBSC) file of claim 7, wherein the DBSC file is further configured to facilitate a client specific conversion process for converting raw XML data retrieved from client servers into DBSC object files, the DBSC file informing the intermediate server regarding what tables should be built to accommodate a client's raw XML data whenever it is received from the client's external server.

9. The database schema configuration (DBSC) file of claim 7, comprising four client configurable sub-sections including: an entities settings sub-section, a transactions settings sub-section, a selection settings sub-section, and a file caching sub-section, wherein the entities settings sub-section defines the client specific table names for data that is being transferred from the intermediary server to a plurality of client devices, wherein the transaction settings sub-section defines the client specific table names for transaction data that is being transferred from the intermediate server to the plurality of clients, and wherein the selection settings sub-section defines the client specific index objects, column objects and download action objects data that are being transferred from the intermediate server to the plurality of client devices, wherein the selection file caching sub-section defines the communication between the intermediate server and the client's mobile device for downloading necessary application files.

* * * * *